United States Patent Office 3,432,575
Patented Mar. 11, 1969

3,432,575
POLYOCTAMETHYLENE OXALAMIDE BLENDED WITH A SECOND FIBER FORMING LINEAR POLYCARBONAMIDE
Joseph Zimmerman, Wilmington, Del., assignor to E. I. du Pont de Nemours and Company, Wilmington, Del., a corporation of Delaware
No Drawing. Continuation-in-part of application Ser. No. 199,375, June 1, 1962. This application July 10, 1962, Ser. No. 208,939
U.S. Cl. 260—857        9 Claims
Int. Cl. C08g 41/04

ABSTRACT OF THE DISCLOSURE

Tire cords may be prepared from fibers of a blend of 10–40% polyoctamethylene oxalamide, with 90–60% linear polycarbonamides having $T_g$'s less than 120° C. The linear polycarbonamides are examplified by poly (tetramethylene suberamide, hexamethylene suberamide, ε-caproamide, n-heptylamide, caprylamide, pelargonamide, decanomide, undecanoamide, m-xylylene adipamide, m-xylylene pimelamide, m-xylylene suberamide, m-xylylene azelamide, m-xylylene sebacamide, hexamethylene adipamide, and hexamethylene sebacamide).

---

This application is a continuation-in-part of application Ser. No. 199,375, filed June 1, 1962, now abandoned.

This invention relates generally to synthetic linear fiber-forming polyamides and, more particularly, to melt blends of such polyamides.

Although yarns made of polyamides such as polyhexamethylene adipamide and poly-ε-caproamide are produced for many textile and industrial end uses, they have limited utility in some important applications because of such properties as their dimensional instability, low modulus and high growth. It is known, for example, that the latter properties contribute directly to the flat-spotting phenomenon which occurs when conventional polyamide yarns are fabricated into tire reinforcement cords. This "flat-spotting" phenomenon is most frequently observed as a temporary but annoying tire vibration when a car equipped with nylon reinforced tires is used after being left in the garage overnight. The vibration or "axle bounce" is caused by a flat spot which develops at the point where the tread contacts the ground as the tire cools from the temperature reached in the previous drive.

The depth of the flat spot produced is a function of tire operating temperature. High operating speeds produce high tire temperatures and large flat spots and therefore present the greatest problem; in this connection, tire temperatures of about 77° C. are developed at driving speeds of about 70 m.p.h. Under these conditions, polyhexamethylene adipamide (66 nylon) and poly-ε-caproamide (6 nylon) cords give flat spots of about 200 mils and 230 mils, respectively. For good performance when these speeds are required, the flat spot should be less than 160 mils. Similarly, the tires on a car standing for long periods of time at room temperature, e.g., in a show room, or those on a car driven at low speeds will often develop a detectable flat spot. Reducing the "standard" flat spot of tires reinforced with nylon cords produced as described herein by 10 mils is sufficient to effect a noticeable improvement in flat spots developed by high driving speeds and to eliminate detectable flat spot disturbances developed by low driving speeds.

It is obvious that any improvement in flat spotting performance must be achieved without appreciable loss in other characteristics such as the tenacity, elongation and fatigue life of filaments in the tire reinforcement cords.

The object of the present invention is to provide a melt blended polyamide yarn having improved dimensional stability, increased modulus and reduced growth which, when fabricated into tire cords, results in substantially reduced flat spotting.

To attain these and other objectives, the polyamide filaments of the invention are prepared from a melt blend of two distinct polyamides, the first polyamide A having a $T_g$ ("glass transition temperature") of no more than 120° C., the second polyamide being a polymer of octamethylene diamine and oxalic acid, i.e., 8–2 nylon. Such a melt blend is produced by mixing at least about 10% (weight percentage, based on total polymer weight) of 8–2 polyamide with a complementary amount (i.e., up to about 90%) of polyamide A, heating and mixing to obtain a homogeneous melt blend, at a temperature at least 1° C. above the melting point of the blend but not above 350° C. and for a minimum period of time. The melt blend is then spun into filaments and drawn.

Due to amide interchange at melting temperatures, the melt blended polyamide of this invention is believed to be, at least in part, a block copolymer in which the segments of each polymer component are of relatively high molecular weight.

There is little additional improvement in flat spotting obtained by adding more than about 40% of the stiffer 8–2 polyamide to the melt blend, and indeed higher amounts may lead to lower fatigue resistance.

Suitable A polyamide have one of the following repeat units:

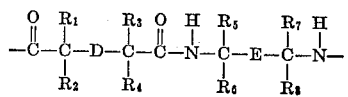

or

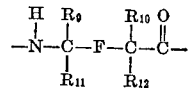

wherein $R_1$–$R_{12}$ are hydrogen or alkyl ($C_1$–$C_4$), D and E are divalent aliphatic, cycloaliphatic or aromatic radicals (when D is a divalent usubstituted aromatic or cycloaliphatic radical, then E must be a divalent aliphatic radical, and vice-versa), and F is a divalent aliphatic radical which may also contain aromatic or cycloaliphatic rings as part of the polymer chain.

Polyamide A may, for example, be any one of the following: polytetramethylene suberamide; polyhexamethylene suberamide; polyhexamethylene adipamide; polyhexamethylene sebacamide; poly-ε-caproamide; poly-n-heptylamide; polycaprylamide; polypelargonamide; polydecanoamide; polyundecanoamide; polymetaxylylene adipamide; polymetaxylylene pimelamide; polymetaxylylene suberamide; polymetaxylylene azelamide; polymetaxylylene sebacamide. It may be a homopolymer, a random or block copolymer, or a polymer blend.

It is preferred, however, that the A polyamide be wholly aliphatic, i.e., that D, E and F be divalent aliphatic radicals. Such polyamides have their tendency to form flat spots reduced to the greatest extent by melt blending with 8–2 nylon, in accord with the instant invention.

These A polyamides are generally characterized by high tenacity and break elongation, an initial (tensile) modulus in the lower ranges, as well as a correspondingly high level of transverse fiber properties. These polyamides show high fatigue life and toughness, but are too elastic to provide the desired level of dimensional stability.

Preparation of these polyamides is well known; suitable processes are disclosed in U.S. Patents 2,071,250; 2,071,253; 2,130,948; and 2,625,536.

The 8–2 polyamide to be melt blended with the A polyamide consists of recurring structural units of the formula:

Fibers of this polyamide are very highly crystalline even when undrawn and are further characterized by high tenacity, low break elongation and very high modulus. Although they are dimensionally stable and can be used as homopolyamides in tires which are quite resistant to flat spotting, the fatigue performance does not equal that of cords from the A polyamides.

The 8–2 polyamide may be prepared by the reaction of octamethylene diamine with an oxalic acid ester in the presence of a suitable polyamidation catalyst to form a low molecular weight prepolymer. This prepolymer may be melt blended with the A polyamide, or it may be further polymerized in the solid phase to the desired viscosity. In a preferred process, the diamine is reacted with a stoichiometric equivalent of di-n-butyl oxalate in the presence of arsenous oxide, the reaction being carried out in dry toluene. Suitable polymerization conditions are described by Bruck in U.S. Patent 2,977,340. In either event, the polymer may be cast or extruded, cut to flake and thereafter melt blended. Alternatively, it may be melt blended without prior solidification. The relatively low melt viscosity is unusual in a polymer having a high modulus in the solid state; the low melt viscosity permits melt blending and spinning in a conventional manner, i.e., as practiced with polyhexamethylene adipamide over the comparable ranges of inherent viscosity.

Generally, when both polyamides are of fiber-forming molecular weight (inherent viscosity above about 0.5) the best balance of fiber properties for tire cords is obtained. However, for many uses, the 8–2 component may be of relatively low molecular weight (i.e., below the fiber-forming range, e.g., from about 0.25 to about 0.45 inherent viscosity).

It is surprising that drawn filaments of the melt blend of the instant invention show an X-ray pattern typical of both components. This may explain the effectiveness of 8–2 polyamides for reducing flat-spotting even under conditions of high cord moisture content. Frequently, if melt-blended polyamide filaments show any crystallinity, it will be only that of the major component. In contrast, random copolymers of the A polyamides and 8–2 do not show the dual X-ray pattern. Such copolymers are less crystalline, and have a lower modulus and tenacity, and also greater tendency to flat-spot, compared to the corresponding melt blends.

In preparing the filaments of this invention, the polyamide mixture is melted and stirred to obtain a homogeneous melt blend. The time during which the blend is held at the melt should be kept to a minimum so that there will be minimum amide interchange between the polyamides, thus maintaining maximum block length for each polymer. These conditions are attained if the molten blend is heated at a temperature at least 1° C. above the melting point of the mixture but not above 350° C. for a period of from $$0 \text{ to } 120 \ (1/2)^{\frac{T-250}{30}}$$

minutes. Preferably, the hold temperature is from 5–50° C. above the melting point of the blend and the period of time involved does not exceed $$60 \ (1/2)^{\frac{T-250}{30}}$$

minutes. In the latter expressions, T is the symbol for the hold temperature in ° C. The above upper limit expression applies to polyamides of normal fiber-forming molecular weight. The presence of acid ends or water catalyzes amide interchange so that shorter times should be employed when abnormal amounts of such reactants are present. Similarly, catalysts (e.g., polyamidation catalysts) may accelerate and inhibitors decrease the exchange rate.

Efficient mixing of the polyamides is required to obtain the desired yarn properties. However, it may be accomplished in any suitable operation such as by mixing flakes or melts. The melt blended product may be converted into yarn by wet, dry or melt spinning, with the latter being the preferred route.

"Set" (described hereinafter) and flat-spotting behavior of the filaments may sometimes be improved by a high temperature heat treatment or anneal; in some cases, the duration or temperature required in the latter step can be decreased by treatment with a plasticizer such as steam or a swelling agent, as long as such plasticizer is not present in the cord when it is incorporated into a tire.

It has been found that the flat-spotting tendency of some polyamide filaments increases with an increase in moisture content. Due to low moisture sensitivity, the filaments of this invention are especially suitable for producing low flat-spotting tires in those situations where it is difficult or impossible to prevent high humidity during tire building or when tires are used under wet conditions.

The filaments of this invention may be incorporated into tires using conventional tire building techniques. For example, conventionally twisted cords from filaments of the blend of 66 and 8–2 are given an adhesive dip and stretched 6 to 20% for 10 to 120 seconds at 220 to 150° C. For best results, low humidity conditions should be maintained in the tire-building area. Conventional tire construction is employed, using dry rubber stock. A very suitable cure is achieved by heating the tire in a press at 139–147° C. for twenty minutes. The partially cured tire is then inflated to 48 lbs. and placed in an oven at 139–159° C. for 45 minutes. This "split" cure is especially effective in preventing shrinkage of the cords within the tire and provides for maximum retention of the improved flat-spotting characteristic of the filaments of this invention.

The polyamide filaments of this invention are not only useful in the production of tire cards of exceptional thermal stability, but they are also useful as reinforcements for fire hoses, belts, mechanical rubber products and as industrial yarns in general, as well as in textile yarns because of their exceptionally high modulus and dimensional stability. Such yarns, in the form of filaments, tow, staple or the like, find utility in carpets, pile fabrics, twills, taffeta, and woven and knitted fabrics generally.

The melt blended polymers of this invention may contain the usual additives for polyamides, including delusterants as disclosed in U.S. Patent 2,205,722, antioxidants such as those disclosed in U.S. Patent No. 2,510,777 or light stabilizers such as those disclosed in U.S. Patent 2,887,462. Polymeric additives may also be present as long as the ratio of A polyamide to 8–2 is maintained.

The symbol $T_g$ employed herein represents a temperature widely recognized in the polymer art and commonly refered to as the "glass transition temperature." Physically this is the temperature at which the amorphous domains of a polymer change from a glassy or brittle condition to a liquid or rubbery one. More generally, it is at this temperature that the viscous mechanism of deformation is most apparent, e.g., at this temperature, there is a change in the slope of the curve relating elastic modulus and temperature and also a change in the slope of the curve relating expansion coefficient to temperature.

The numerical value obtained for $T_g$ in any case is highly dependent upon the method of determination. The values reported herein are determined by measuring the temperature at which maximum work loss occurs when a filament is cyclically stressed. The manner in which this temperature is related to maximum mechanical work loss is given in "Die Physik der Hochpolmeren," A. S. Staverman and F. Schwarzl, Band IV, Springer—Verlag, Berlin, 1956, Chapter I. Measurements are made at 0.1 cycles per second, with a strain amplitude of ±0.8%. The maximum value of tangent delta of the publication corresponds to the $T_g$ of the present specification.

The flat spot depth is defined as the maximum radial distance in mils between the normal periphery of a tire and the geometric chord presented by a flat spot, produced under "standard" conditions. "Standard" tire flat spots are laboratory produced by inflating 8.50 x 14, 4-ply tires to 22 p.s.i.g., heating to 77° C., then loading to 1085 lbs. for 2 hours, i.e., until the tire has cooled. The radial deformation, in mils, is the flat spot depth. Where reference is made herein to "standard" flat spot values, the tires have been built under conditions of 20% R.H. or lower and tire cord moisture is less than 1% at the time of testing.

The temperature to which the tire is heated before loading has been found to correlate with car operating speeds, as follows:

|  | M.p.h. |
|---|---|
| 64° C. (147° F.) | 50 |
| 77° C. (171° F.) | 67 |
| 91° C. (195° F.) | 85 |
| 121° C. (250° F.) approx. | 125 |

Flat spot depth can be predicted from laboratory measurements of the "set" of tire cords at a specified humidity, as described at page 4, line 14, et seq. in my copending application Ser. No. 199,375, filed June 1, 1962.

In the following examples, parts and percentages are reported on a weight basis unless otherwise indicated. The inherent viscosity is calculated from the formula:

$$\text{inherent viscosity} = \frac{\ln (\text{relative viscosity})}{0.5}$$

The relative viscosity is determined conventionally using a sulfuric acid or, when indicated, trifluoroacetic acid solution of the polymer, the solution containing 0.5 g. polymer per 100 ml. at 25° C. The relative viscosity of the A polyamide is determined as defined in U.S. Patent No. 2,385,890.

EXAMPLE I

One equivalent (147 g.) of purified octamethylene diamine is dissolved in about 1.5 times its weight of dry toluene in a nitrogen-blanketed reactor. Approximately 0.2% of arsenous oxide, based on the diamine, is suspended in the diamine solution by vigorous stirring for 5 minutes. An equivalent (206 g.) of di-n-butyl oxalate is then added rapidly to the reactor, following which the sides of the vessel are washed with 1 lb. of dry toluene. The reaction mixture is stirred vigorously until it sets to a hard white mass (approximately 5 minutes), which is then cooled under nitrogen and dried under vacuum for 6 hours at 145–150° C. The resulting prepolymer has inherent viscosities between 0.1–0.3.

The prepolymer prepared as above is further polymerized in the solid phase by heating at 250–270° C. under dry nitrogen, the ultimate reaction time depending on the desired inherent viscosity in the final polymer. For example, after 6 hours' heating, the resulting polymer exhibits an inherent viscosity of 0.74.

In a run similar to the foregoing except that sodium phenyl phosphinate is employed as the polyamidation catalyst, the inherent viscosity of the resulting polymer is 1.32 after treatment for 8 hours in a rotary kiln at the indicated temperature under dry nitrogen.

Polymers prepared in this manner melt at about 280° C., the density being about 1.18, as compared with a density of about 1.14 for poly(hexamethylene adipamide). A sample of poly(octamethylene oxamide) of 0.85 inherent viscosity has a melt viscosity of 311 poises at 295° C.

Following the above procedure for preparing the polyoxamide, a mixture of polyhexamethylene adipamide (45 relative viscosity) and polyoctamethylene oxamide (0.8 inherent viscosity in trifluoroacetic acid) containing 90% and 10% by weight of the respective ingredients is prepared by homogenizing the molten components, which are supplied from separate metered streams. The melting point of a sample of the resulting mixture is about 269° C. The blended melt is then passed to a meter pump and spun into filaments. The filaments are drawn 5.3× to yield a 200 denier 34 filament yarn. A sample of the conditioned yarn (48 hours at 75° C. and 55% relative humidity) exhibits a tenacity of 7.8 g.p.d., an initial modulus of 65 g.p.d. and an elongation-at-break of 11%. The melt blended polymer can be distinguished from the corresponding copolymer by chromatographic analysis in that samples can be separated into two fractions, each rich in one of the two polymers.

The yarn is plied and twisted into an approximately 1800 denier cord, which is hot stretched under 3.6 kg. tension for 60 seconds at 220° C. The cord has a tenacity of 7.3 g.p.d., a break elongation of 10.9%, and a cold growth of 3.6% after 30 minutes under a load of 1 g.p.d. It shows a laboratory "set" value (1 minute test) of 1.18% which is equivalent to a tire flat spot of 169 mils.

The "set" value for a typical cord of 6–6 nylon is 1.42% which is equivalent to a tire flat spot of 189 mils.

When the test is repeated, using polycaproamide (6 nylon) as the A polymer with which the 8–2 polyamide is melt blended, a similar proportional improvement is obtained over unmodified 6 nylon.

EXAMPLE II

A batch of 8–2 prepolymer is prepared, as described in Example I. It has an inherent viscosity of 0.32. Ten parts of the prepolymer is melt blended with 90 parts of 66 nylon using two screw melters, as in Example I. The blend is spun to yarn, which is drawn 5.2×. The yarn tenacity is 7.8 g.p.d., elongation 11.3%, and the initial modulus is 61 g.p.d. When the yarn is annealed on the package (taut) for 16 hours at 200° C. in nitrogen, the modulus increases to 74 g.p.d. The tenacity is 7.6 g.p.d., and the break elongation is 13.1%. After making cord from this yarn and hot stretching at 1.8 kg. tension for 60 seconds at 200° C., the predicted tire flat spot is 155 mils.

EXAMPLE III

Following the procedures of Example I, melt blends in other proportions are prepared and tested, as shown in the following table. In each case, the 8–2 polyamide has an inherent viscosity of 0.8 to 0.9 and the 6–6 nylon with which it is blended has a relative viscosity of 45. The yarns are spun, drawn, twisted to cords and hot stretched, as before. The cords are stretched under 1.8 kg. tension for 60 seconds at 200° C. The predicted tire flat spot is given for each cord. This value, like those given previously, is measured on dry cords (i.e., at about 5% R.H.) and is typical of the value observed in a tire with dry cords and dry rubber stock.

TABLE

| Sample | Weight ratio, 6-6:8-2 | Predicted flat spot, mils |
|---|---|---|
| III-A | 90/10 | 152 |
| III-B | 80/20 | 146 |

When sample B is retested at 40% R.H. a value of 150 is obtained. The negligible difference between these values is an indication of the low moisture sensitivity of this cord.

When the test is repeated, using poly(hexamethylene sebacamide) and poly(tetramethylene suberamide), respectively, as the A polyamide, similar improvements are obtained.

Having thus described the invention, what is claimed as new and desired to be secured by Letters Patent is:

1. A fiber-forming polymeric melt blend of from about 10 to about 40% by weight of polyoctamethylene oxalamide and from 90 to about 60% by weight of a synthetic linear polycarbonamide having a glass transition temperature of no more than about 120° C. and consisting essentially of repeating units of a formula selected from the class consisting of:

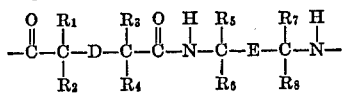

and

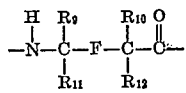

wherein $R_1$ to $R_{12}$, inclusive, are members of the class consisting of hydrogen and lower alkyl containing no more than about 4 carbon atoms, D and E are divalent radicals from the class consisting of aliphatic, cycloaliphatic and aromatic radicals at least one of D and E being aliphatic, and F is a divalent aliphatic radical which may contain aromatic or cycloaliphatic rings.

2. The melt blend of claim 1 wherein each of D, E, and F is wholly aliphatic.

3. The melt blend of claim 1 wherein said polycarbonamide is taken from the group consisting of polyhexamethylene adipamide, polyhexamethylene sebacamide, polycaproamide and polytetramethylene suberamide.

4. A tire cord fabricated from a plurality of filaments formed from the melt blend of polymers of claim 2.

5. A synthetic polymeric filament consisting essentially of a blend of polyhexamethylene adipamide and from about 10–40% by weight of polyoctamethylene oxamide.

6. A tire cord fabricated from a plurality of the filaments of claim 5.

7. A fiber-forming polymer blend comprising about 60–95% of a polyamide selected from the group consisting of polyhexamethylene adipamide, polyhexamethylene sebacamide, poly-ε-caproamide and poly-11-undecanoamide and about 5–40% of a polyoxamide of octamethylene diamine.

8. A process for making a fiber-forming polymer blend as set forth in claim 9 in which preformed polyamide and preformed polyoxamide are thoroughly mixed with good agitation in the molten condition.

9. A process for making a fiber-forming polymer blend which comprises blending, in the molten state, about 60–95% of a polyamide selected from the group consisting of polyhexamethylene adipamide, polyhexamethylene sebacamide, poly-ε-caproamide and poly-11-undecanoamide and about 5–40% of a polyoxamide of octamethylene diamine.

References Cited
UNITED STATES PATENTS

| | | | |
|---|---|---|---|
| 2,339,237 | 1/1944 | Brubaker et al. | 260—857 |
| 2,977,340 | 3/1961 | Bruck | 260—78 |
| 3,057,389 | 10/1962 | Dubetz et al. | 152—210 |
| 2,193,529 | 3/1940 | Coffman | 260—857 |

SAMUEL H. BLECH, *Primary Examiner.*

PAUL LIEBERMAN, *Assistant Examiner.*

U.S. Cl. X.R.

152—359; 260—78